US012630726B2

(12) United States Patent
Ross

(10) Patent No.: US 12,630,726 B2
(45) Date of Patent: May 19, 2026

(54) MANUFACTURING ART PAINTS FROM DISCARDED MATERIALS

(71) Applicant: Encore Artistic Solutions, Inc, Laguna Beach, CA (US)

(72) Inventor: Steve Ross, Laguna Beach, CA (US)

( * ) Notice: Subject to any disclaimer, the term of this patent is extended or adjusted under 35 U.S.C. 154(b) by 360 days.

(21) Appl. No.: 18/167,910

(22) Filed: Feb. 13, 2023

(65) Prior Publication Data

US 2023/0257602 A1 Aug. 17, 2023

Related U.S. Application Data

(60) Provisional application No. 63/309,355, filed on Feb. 11, 2022.

(51) Int. Cl.
| | |
|---|---|
| *C09D 7/80* | (2018.01) |
| *C09D 7/41* | (2018.01) |
| *C09D 7/43* | (2018.01) |
| *C09D 133/08* | (2006.01) |

(52) U.S. Cl.
CPC ................ *C09D 7/80* (2018.01); *C09D 7/41* (2018.01); *C09D 7/43* (2018.01); *C09D 133/08* (2013.01)

(58) Field of Classification Search
CPC ... C09D 7/80; C09D 7/41; C09D 7/43; C09D 133/08
See application file for complete search history.

(56) References Cited

U.S. PATENT DOCUMENTS

| | | | |
|---|---|---|---|
| 2003/0064163 A1* | 4/2003 | Uenoyama ............... | C09D 7/71 427/424 |
| 2020/0032082 A1* | 1/2020 | Matawala ................ | C09D 7/80 |

FOREIGN PATENT DOCUMENTS

| | | | | |
|---|---|---|---|---|
| WO | WO-2009105809 A1 * | 9/2009 | ............. | C09D 11/16 |
| WO | WO-2012095520 A2 * | 7/2012 | ............... | C09D 5/02 |

* cited by examiner

*Primary Examiner* — Pamela H Weiss
(74) *Attorney, Agent, or Firm* — Miller IP; Devin Miller

(57) ABSTRACT

Art paints or base materials can be manufactured from discarded materials such as architectural paint to reduce waste paint and to produce high quality art paints at a low cost and with a low ecological impact. Discarded architectural paint or other feedstock material is sorted, treated, and mixed with additives such as colorant, polymers, or monomers in a dispersion to produce a high-quality art paint. The high quality art paint can have selected traits, such as color, sheen, dry time, viscosity, or other properties, that are desirable for art paints but not traditionally present in the source feedstock materials.

20 Claims, 3 Drawing Sheets

200

300

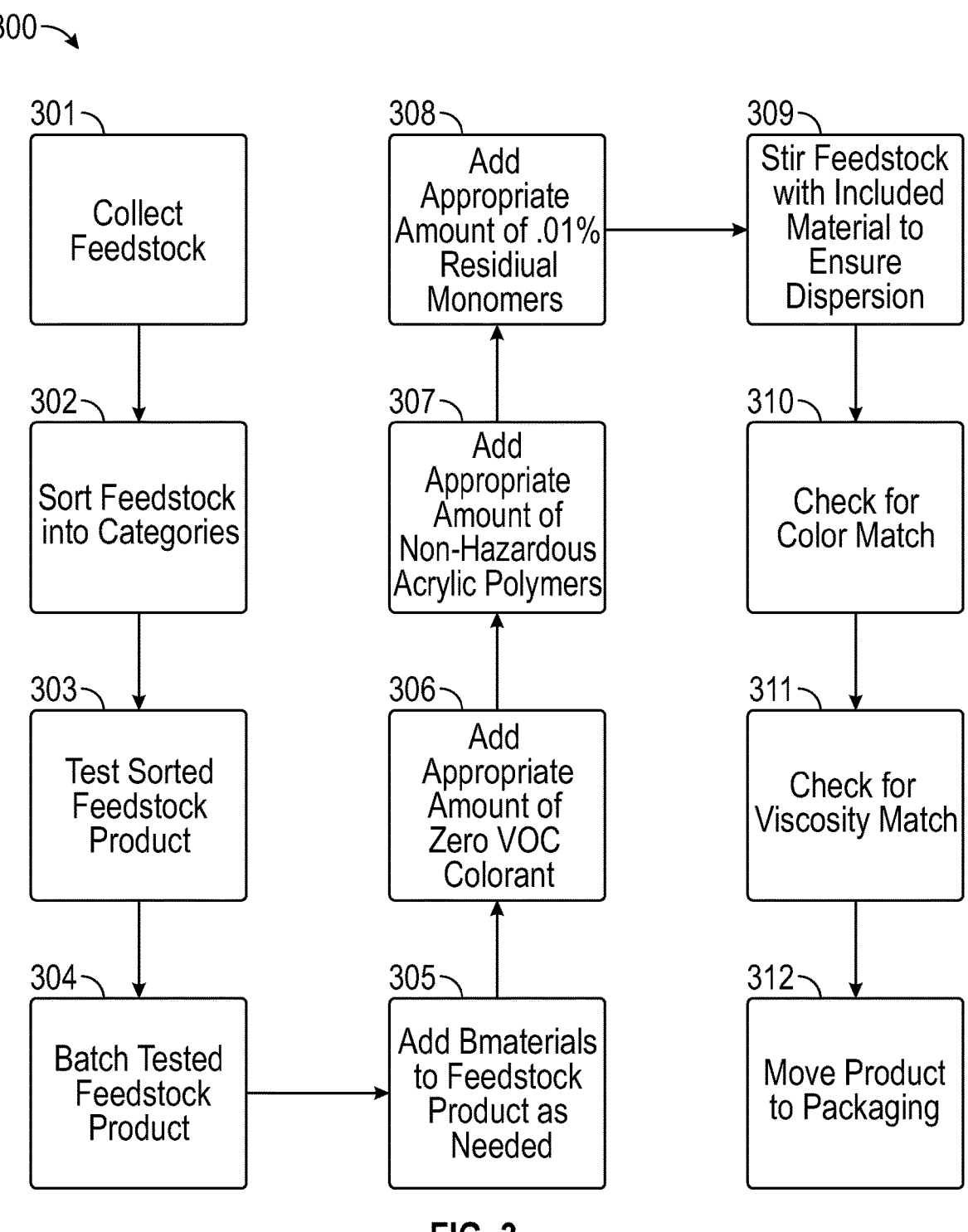

301 — Collect Feedstock

302 — Sort Feedstock into Categories

303 — Test Sorted Feedstock Product

304 — Batch Tested Feedstock Product

305 — Add Bmaterials to Feedstock Product as Needed

306 — Add Appropriate Amount of Zero VOC Colorant

307 — Add Appropriate Amount of Non-Hazardous Acrylic Polymers

308 — Add Appropriate Amount of .01% Residiual Monomers

309 — Stir Feedstock with Included Material to Ensure Dispersion

310 — Check for Color Match

311 — Check for Viscosity Match

312 — Move Product to Packaging

FIG. 3

MANUFACTURING ART PAINTS FROM DISCARDED MATERIALS

CROSS-REFERENCE TO RELATED APPLICATIONS

The present application claims the benefit of U.S. Provisional Patent Application No. 63/309,355 entitled "MANUFACTURING PAINTS FROM DISCARDED MATERIALS", filed on Feb. 11, 2022. The entire contents of the above-listed application are hereby incorporated by reference for all purposes.

BACKGROUND

Paints are used both artistically and architecturally to provide color, visual appeal, and other benefits. Paints can serve a variety of purposes and may have various properties suited for different uses. In particular, artists utilize a variety of different types of paints to create their artworks including, for example, acrylic, oil, watercolor, gouache, and encaustic. In addition, each type of paint may vary in its chemical composition, which leads to different colors, sheen, textures, and viscosities.

BRIEF DESCRIPTION OF THE DRAWINGS

The present description will be understood more fully when viewed in conjunction with the accompanying drawings of various examples of manufacturing art paints from discarded materials. The description is not meant to limit the paints which may be manufactured from discarded materials to the specific examples disclosed herein. Rather, the specific examples depicted and described are provided for explanation and understanding of both the exemplified paints as well as other paints manufactured from discarded materials, each of which will be made apparent to one of ordinary skill in the art by this disclosure. Throughout the description the drawings may be referred to as drawings, figures, and/or FIGS. interchangeably. Also, the terms "paint" and "material" may be used to reference both a singular paint or material and a plurality of paints or materials. In other words, references to paint manufactured from material are non-limiting and may refer also to multiple paints manufactured from multiple materials.

FIG. 3 illustrates a flow chart depicting steps involved in manufacturing paints from discarded materials, according to an embodiment.

DETAILED DESCRIPTION

Figure 1:
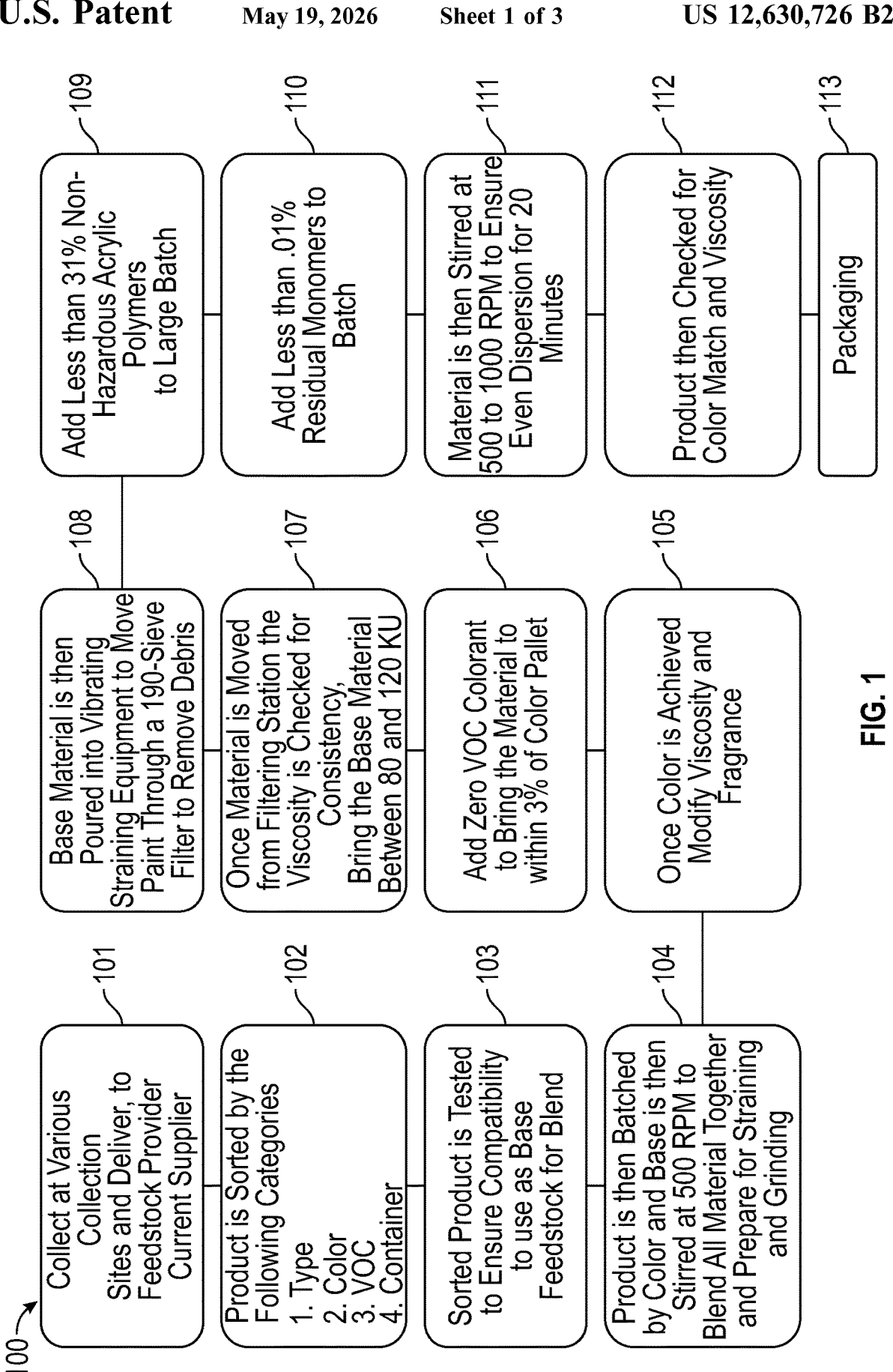
FIG. 1 illustrates a flow chart depicting steps involved in manufacturing paints from discarded materials, according to an embodiment.

Paints manufactured from discarded materials, and the like, as disclosed herein will become better understood through a review of the following detailed description in conjunction with the figures. The detailed description and figures provide merely examples of the various embodiments of manufacturing various types of art paint from discarded architectural paint. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Generally, art paint is manufactured from scratch using raw materials and placed into sealed containers for distribution to consumers. However, in the United States alone, over 70 million gallons of architectural paint are discarded each year. Architectural paint can include interior and exterior paints, primers, sealers, varnishes, and stains. Generally, Architectural paint is applied onsite to residential, commercial, institutional, and industrial buildings. Architecture paint does not include industrial maintenance coatings, special-purpose coatings, or allied paint products.

Architectural and/or industrial paint can be discarded due to drying, mixing, tainting, or simply because there is a surplus of material. Base materials that can be used for production of art paint are not being utilized. Further, the use of these base materials can reduce the cost and environmental impact of art paint production. The disposal of architectural paint is a waste of available resources that can be repurposed towards new art paint.

The enormous waste of discarded architectural paint is not only damaging to the environment but is also a missed opportunity for utilization as a potential resource. Because industrial paints and architectural paints have low production costs they are not often seen as a resource worth of recycling. Additionally, proper disposal of discarded waste paint can be more costly than producing new paint. Therefore, recycled paints and new paints will find themselves in the same streams of commerce, inevitably leading to more discarded waste paint.

Implementations of manufacturing paints from waste materials therefore, as disclosed herein, address some of the problems described above by addressing both the availability of affordable and ecofriendly art paints and art paint supplies, and the massive waste generated by discarded architectural paint.

Discarded paints, or waste paint materials, may be used to develop art paint products and to build a community of artists and hobbyists or other manufactures that want to make an ecological impact. Manufacturing art paint products from recycled materials can solve this problem of massive waste by using discarded and/or unused architectural paint. The discarded paints can be turned into recycled feedstock, such as recycled waste architectural paint and recycled waste industrial paint.

By properly sorting and treating feedstock material, such as discarded architectural paint, the discarded material may be repurposed into art paints. Art paints can include high-quality art paints or base material stock having various properties desirable to artists, hobbyists or manufactures. The properties of the recycled paints can be different from the properties of the original source material. The waste material may include discarded household paint, industrial paint, architectural paint, or the like. By altering the formulation, treatment and preparation of the recycled materials, the resulting art paints can have unique viscosity, sheen, flatness, color, dry time, or other properties desirable for art paint or base material stock.

FIG. 1 illustrates the manufacture of paints, or art paint base materials, from discarded materials according to an embodiment. High-quality art paints may be manufactured from discarded waste material, or "feedstock" that is industrial or architectural in origin. By properly sorting, treating, and mixing batches of feedstock material, desirable qualities may be achieved that were not present in the source material. For example, leftover house paint traditionally has poor quality for artistic purposes. However, by sorting, treating, and mixing leftover house paint as disclosed herein, a suitable art paint or base material stock product may be manufactured or produced.

As illustrated in FIG. 1, a method of manufacturing paint or art paint base materials 100 can include one or more collection of feedstock steps 101, sorting of feedstock steps 102, testing of feedstock step 103, batching of feedstock steps 104, vibration of base material and sieving/straining step 105, check of viscosity step 106, addition of colorant to feedstock step 107, addition of a viscosity modifier and a fragrance additive to feedstock step 108, addition of acrylic polymers step 109, addition of residual monomers step 110, stirring of base materials step 111, color check and viscosity check step 112, and packaging step 113.

As used herein, "feedstock" may refer to the art paint base material comprising discarded industrial or household paint (waste paint material), or the like. Further, "feedstock" may refer not only to such base materials in their raw form but may also be used herein to refer generally to sorted feedstock, tested feedstock, altered feedstock, colored feedstock material, material having both feedstock and additives, and the like.

Feedstock can be obtained from various sources and may include a variety of materials. Discarded paint can be first pieced and sorted by type, color, volatile organic compound ("VOC") content, container type, or other qualities. In one embodiment, the material is sorted by hand and batched with like colors.

The sorted feedstock can be batched by color or other properties, including type, volatile organic compounds content, and container. Type includes base chemical type, such as organic (oil based, latex), acrylic, or aqueous paints (water based). The batches of feedstock can then be stirred. In an embodiment, a stir rate of about 500 rpm can be suitable for blending without degrading or damaging the product. In another embodiment, a stir rate of about 20 to 1800 rpm may be suitable. In embodiments, the batches of feedstock can be mixed in various batch mixers from about 55 gallons to about 500 gallons in size. In embodiment, batches are checked periodically during mixing to measure or confirm viscosity.

The feedstock can by poured or strained. Vibrating straining equipment can be suitable for this purpose. The feedstock paint can be moved or passed through a 190-sieve filter. Alternative sieve filters can be employed, including, but not limited to micron filters such as 37 microns, 40 microns, 44 microns, 70 microns, 100 microns, and so forth. Filtering can help remove debris or unwanted material from the feedstock paint. In an embodiment, the feedstock is strained to remove unwanted material and then filtered to remove small particulate matter. This allows a smooth, silky finish for the final product.

The feedstock paint can then be checked for consistency. By treating the feedstock paint, the viscosity is brought within the range of 80-170 Krebs Units (KU). In one example, a viscosity range may be 80 to 120 KU. In another example, a viscosity range may be 120 to 170 KU Zero volatile organic compound (VOC) colorant can then be added to bring the feedstock paint material to within a predetermined % age range of a predetermined color. In an embodiment, the amount of VOC colorant is appropriate (or at a zero volatile organic compound concentration of) to bring the material to within 3% of a predetermined color. Alternate ranges for the predetermined color can be between 2 and 5%, between 1 and 10%, or between 5 and 8%. In embodiments, the zero volatile organic compound colorant is added to bring (or configured to bring) the color of the art paint base material to within 3% of a selected color pallet.

In some embodiments, the VOC colorant products used contain isothiazolinones. In embodiments, the isothiazolinones is 1,2-benzisothiazolin-3-one at a concentration of 0.04 to 0.0004% by weight In embodiments or a 2-methyl-3-isothiazolone at concentration of 0.0006 weight %. Volatile organic compound colorant products (VOC colorant) can be provided by materials suppliers, and can be selected from the products listed in TABLE I.

TABLE I

| Product name | generic name | weight of active in the additive (%) |
|---|---|---|
| )96-1300 FUTURITY ZERO VOC COLORANT CONCENTRATE M DURABLE RED | 1,2-Benzisothiazolin-3-one | 0.04 |
| 96-5000 PPG HS COLORANT CONCENTRATE EX PHTHALO BLUE | 1,2-Benzisothiazolin-3-one | 0.00002 |
| 96-5000 PPG HS COLORANT CONCENTRATE EX PHTHALO BLUE | 1,2-Benzisothiazolin-3-one | 0.00003 |
| 96-5000 PPG HS COLORANT CONCENTRATE EX PHTHALO BLUE | 1,2-Benzisothiazolin-3-one | 0.0006 |
| 96-5000 PPG HS COLORANT CONCENTRATE EX PHTHALO BLUE | 1,2-Benzisothiazolin-3-one | 0.003 |
| 96-5000 PPG HS COLORANT CONCENTRATE EX PHTHALO BLUE | 1,2-Benzisothiazolin-3-one | 0.004 |
| 96-3000 PPG HS COLORANT CONCENTRATE CX YELLOW OXIDE | 1,2-Benzisothiazolin-3-one | 0.00004 |
| 96-3000 PPG HS COLORANT CONCENTRATE CX YELLOW OXIDE | 1,2-Benzisothiazolin-3-one | 0.0008 |
| 96-3000 PPG HS COLORANT CONCENTRATE CX YELLOW OXIDE | 1,2-Benzisothiazolin-3-one | 0.003 |
| 96-3000 PPG HS COLORANT CONCENTRATE CX YELLOW OXIDE | 1,2-Benzisothiazolin-3-one | 0.004 |
| 96-5000 PPG HS COLORANT CONCENTRATE EX PHTHALO BLUE | 2-Methyl-3-isothiazolone | 0.0006 |

Other additives can be included once color is achieved to optimize fragrance, flatness, viscosity, or other qualities. For example, EPS2843 and/or ACRYSOL™ TT-615 may be included for viscosity; Kaolin, Silica powder, ground calcium carbonate, Talc and/or various liquid flattening agents may be included for flatness; and Ammonia, Baking Soda, Scentco liquid additive may be added for odor.

Such additives can include but are not limited to, titanium dioxide 10-40% heavy and standard duty; acrylic polymer (not hazardous EPS2843) 10-40% heavy and standard duty; water 5-10% heavy and standard duty; durable red (Glycerol) less than 1-5% heavy and standard duty; CX Yellow Oxide (Glycerol) less than 1-5% heavy and standard duty; CX yellow oxide alcohols $C_{16}$ and $C_{18}$-unsaturated, ethoxylated less than 1-5% heavy and standard duty; EX Phthalo blue (Glycerol) less than 1-5% heavy and standard duty; EX Phthalo blue (Alcohols, $C_9$ and $C_{11}$, ethoxylated) less than 1-3% heavy and standard duty; EX Phthalo blue (Kaolin) less than 20-50% heavy and standard duty; EX Phthalo blue (Z)-9-Octadecen-1-ol ethoxylated, less than 1-5% heavy and standard duty; EX Phthalo blue dodecylbenzenesulphonic acid compound with isopropylamine (1:1) less than 1 to 4.7% heavy and standard duty; EX Phthalo blue titanium oxide less than 1% heavy and standard duty; heavy duty body; all colors acrylic polymers, not hazardous less than 29 to 31% heavy duty body; heavy body all colors residual monomers not required less than 0.01% heavy duty body; and heavy body all colors water, less than 69 to 71% heavy duty body.

Examples of the fragrance additive include, but are not limited to vanilla, cinnamon, floral, neutral, scentco neutralizer. ammonia, baking soda, scentco liquid additive, and so forth.

In one embodiment, a flattening agent is included among the other additives. Embodiments of a preferred flattening agent include organic thermoset polymethyl urea resins (PMU). Such resins provide additional desired benefits such as low gloss, rheology, abrasion resistance, coin-marking, water resistance, chemical resistance, heat resistance, and soft feel as compared to other flattening agents, such as silica and polypropylene. However, various flattening agents or mixtures of flattening agents can also be suitable according to various embodiments. Additional flattening agents can include silica powder, ground calcium carbonate, talc, various liquid flattening agents, and so forth.

According to an embodiment, non-hazardous acrylic polymers can be added to feedstock paint batches. In one example, the acrylic polymers may be added at a weight ratio of less than 31% of the feedstock. In another example, the acrylic polymers may be added at a weight ratio of less than less than 31% in total to maintain a 70% post-consumer claim. In another example, the range may vary based on a threshold viscosity level, such as 1 to 10%, 10 to 20%, or 20 to 30%. Additional polymers that can be added to the feedstock include poly(methacrylate); PMMA, poly(methyl methacrylate); PEMA, poly(ethyl methacrylate); poly-HEMA, poly(2-hydroxyethyl methacrylate). In one example, the ranges may vary based on desired viscosity. In embodiments, the acrylic polymer is added to the art paint base material at a weight ratio of about 31% by weight of the art paint base material. According to an embodiment, less than 0.01% residual monomers can be added to a feedstock paint batch.

Examples of viscosity modifiers include, but are not limited to waxes, clays, swellable materials, Acysol™ TT-615, EPS styrene acrylic latex, and so forth.

Once the feedstock paint material has been treated and additives (when necessary) have been added, the feedstock paint material is stirred to ensure an even dispersion. Embodiments include stirring at 500 to 1000 rotations per minute (rpm) for about 20 minutes to ensure an even dispersion of the feedstock paint material. Traditionally higher blend speeds are used for architectural paint. However, higher blend speeds cause increased air in the resulting product, which may be unacceptable for use as art paint.

The blended material is then checked for color and viscosity match. If the blended material is within an acceptable range of color and viscosity, the product can be moved to a packaging. The packaged final product can be used as art paint.

In embodiments, during the sorting step the feedstock material can be sorted by base chemistry. Then, after sorting by base chemistry, the feedstock material can be sorted by color range. After being sorted by color range, the feedstock material can be moved to a first straining. Next, the feedstock material can be tested for viscosity. The viscosity testing can be done first visually, and then with a rotary viscometer. In embodiments, the viscosity can be adjusted down by adding water to the feedstock material or adjusted up by adding acrylic polymer or additional paint (or additional feedstock) until the viscosity matches a predetermined base line. In an embodiment, the feedstock material can have a viscosity of about 80 to 170 Krebs Units (KU). In an alternative embodiment for the preparation of heavy body paint material, acrylic polymers are added until a target viscosity of about 150 KU is reached. Embodiments of the heavy body art paint base material, or art paint base material can have greater than 31% acrylic polymer by weight.

Figure 2:
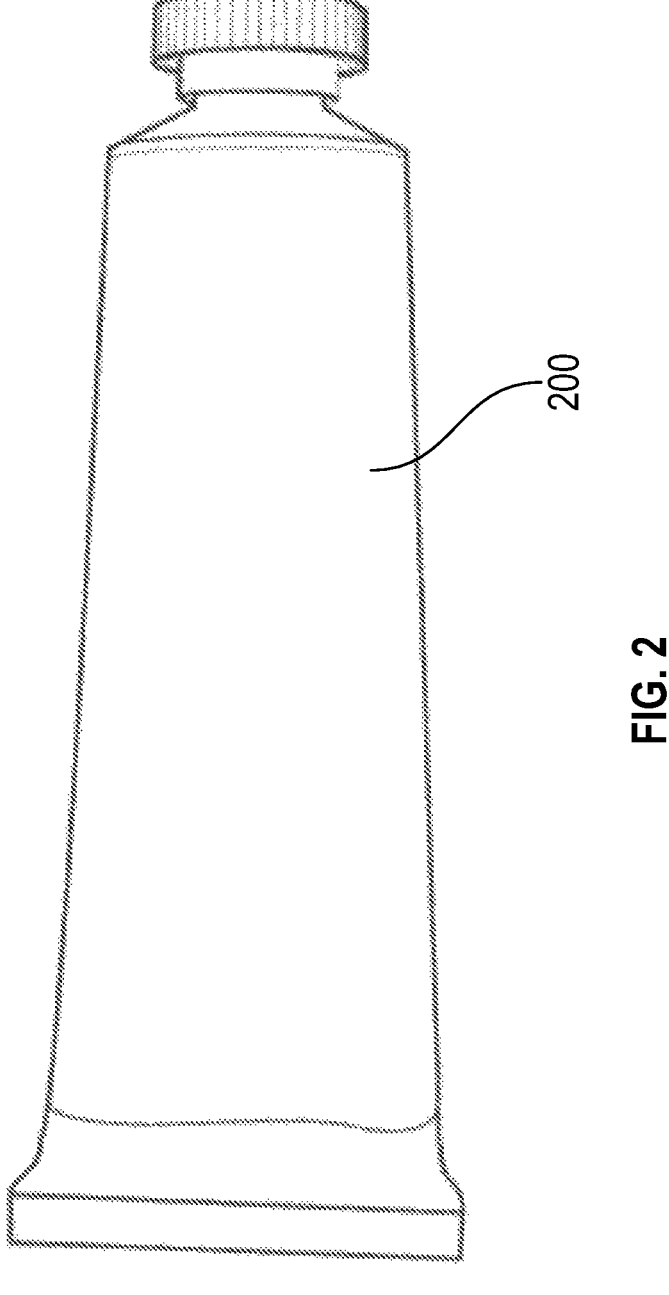
FIG. 2 illustrates an art paint product, according to an embodiment.

FIG. 2 illustrates a tube of art paint product 200, according to an embodiment. Alternative containers for packaging and/or shipping finished art paint materials, can include, jars, cans, and/or tubes.

By increasing or decreasing the viscosity or other properties to within a desired range, high-quality art paint matching the demands of a specific consumer can be achieved. For example, low sheen material, medium body material, heavy body material, and the like.

In an embodiment, the art paint product 200 can be a "heavy body" art paint product 200 manufactured as disclosed herein. Heavy body art paint products produced as described herein have responded surprisingly well to handling. Handling includes the quality of the art paint material after the art paint material has dried on canvas. Unlike similar paint materials, the art paint material disclosed herein has superior flexibility and durability. Durability has been shown by art paint materials that are capable of being used on a large canvas piece, being removed from a wood frame, rolled up, shipped across country, and mounted on new frame without the damage or compromising that would occur to traditional material.

In embodiments, traditional additives can be replaced to decrease the ecological impact of paint manufacturing. For example, silicon flattening agents have been traditionally used but can have negative environmental impacts. Further, such agents can be dangerous if sanded and inhaled after application. According embodiments, additives can be replaced with greener alternatives to reduce the ecological impact of manufacture. Greener alternative additives include bio based organic pigments, bio based resins, bio based dispersants, plant based neutralizing agents, plant based defoamers, These additive can be used in 1 to 31% by weight of the final art paint product.

FIG. 3 illustrates alternative steps which can be involved in the manufacture of product 200. The steps appearing in FIG. 3, are shown in a given order for purposes of example only. Certain steps may be reordered, repeated, or left out entirely without departing from the scope of this disclosure.

As illustrated in FIG. 3, a method of manufacturing paint or the base material stock 300 can include a collection of feedstock step 301, sorting of feedstock into categories step 302, testing of feedstock step 303, batching of feedstock steps 304, addition of additives to feedstock step 305, addition of colorant to feedstock step 306, addition of acrylic polymer to feedstock step 307, addition of residual monomers to feedstock step 308, stirring of base materials step 309, color check step 310, viscosity check step 311, and packaging step 312.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise.

Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A method, comprising:
collecting feedstock, wherein:
the feedstock comprises waste paint materials;
sorting the feedstock, wherein:
the feedstock is sorted via color, base chemical type, container and volatile organic compounds;
testing the feedstock for viscosity and color;
batching the feedstock according to color and type;
stirring the feedstock to produce an art paint base material;
adding a viscosity modifier and a fragrance additive to the art paint base material;
adding zero volatile organic compound colorant to the art paint base material;
checking the viscosity of the art paint base material;
straining the art paint base material;
adding acrylic polymers to the art paint base material;
adding residual monomers to the art paint base material;
stirring the art paint base material to ensure an even dispersion;
checking the color of the art paint base material;
checking the viscosity of the art paint base material; and
packaging of the art paint base material.

2. The method of claim 1, wherein:
during the stirring the feedstock to produce an art paint base material, the feedstock is stirred at 500 to 1000 rpm;
the viscosity modifier is a clay; and
the fragrance additive is vanilla.

3. The method of claim 1, wherein:
during the checking of the viscosity of the art paint base material, the art paint base material has a viscosity of between 80 and 170 Krebs Units;
during the adding of zero volatile organic compound colorant to the art paint base material; and
the zero volatile organic compound colorant is added to bring the color of the art paint base material to within 3% of a selected color pallet.

4. The method of claim 1, wherein during the straining of the art paint base material the art paint base material is poured into vibrating straining equipment through a 190-sieve filter to remove debris from the art paint base material.

5. The method of claim 1, wherein:
the acrylic polymer is added to the art paint base material at a weight ratio of 31% by weight of the art paint base material; and
the residual monomer is added to the art paint base material at a weight ratio of less than 0.01% by weight of the art paint base material.

6. The method of claim 1, wherein during the stirring of the art paint base material to ensure an even dispersion, the art paint base material is stirred at 500 to 1000 rpm for 20 minutes.

7. The method of claim 1, wherein:
the zero volatile organic compound colorant is a isothiazolinones; and
the isothiazolinones is 1,2-benzisothiazolin-3-one at a concentration of 0.04 to 0.0004% by weight.

8. A system, comprising:
collecting feedstock, wherein the feedstock comprises waste paint materials;
sorting the feedstock via at least one of color, base chemical type, container or volatile organic compounds;
testing the feedstock;
batching the feedstock;

stirring the feedstock to produce an art paint base material;
adding additives to the art paint base material;
adding zero volatile organic compound colorant to the art paint base material;
adding acrylic polymers to the art paint base material;
adding residual monomers to the art paint base material;
stirring the art paint base material;
checking the color of the art paint base material;
checking the viscosity of the art paint base material; and
packaging of the art paint base material.

9. The system of claim 8, wherein:
during the stirring of the feedstock to produce an art paint base material, the art paint base material is stirred at 20 to 1800 rpm; and
the viscosity of the art paint base material is from 80 to 170 Krebs Units.

10. The system of claim 9, wherein:
the viscosity testing is done first visually, and then via rotary viscometer; and
the viscosity can be adjusted down by adding water to the feedstock material or adjusted up by adding acrylic polymer or additional feedstock until the viscosity matches a predetermined base line.

11. The system of claim 8, wherein:
the art paint base material is a heavy body art paint base material; and
the heavy body art paint base material has a viscosity of 150 Krebs Units.

12. The system of claim 8, wherein the additive is a greener alternative additive selected from the group consisting of bio based organic pigments, bio-based resins, bio-based dispersants, plant based neutralizing agents, plant based defoamers, or combinations thereof.

13. A composition, comprising:
art paint base material comprising:
recycled feedstock, wherein the recycled feedstock comprises:
waste architectural paint and waste industrial paint, wherein the feedstock:
is collected from waste industrial materials;
is sorted based color, base chemical type, container, organic compounds, or volatile organic compounds;
is tested for viscosity and color;
is batched according to the color and a type;
is stirred to produce the art paint base material and to ensure an even dispersion;
comprises a viscosity modifier and a fragrance additive to the art paint base material;
comprises an added zero volatile organic compound colorant to the art paint base material;
is checked for a viscosity level of the art paint base material;
is strained;
comprises an acrylic polymer added to the art paint base material;
comprises a residual monomer added to the art paint base material;
is checked for the color of the art paint base material;
is checked for a viscosity of the art paint base material; and
the viscosity modifier, wherein the viscosity modifier comprises:
clay, wax, resin, or a polymer;

a fragrance additive, wherein the fragrance additive comprises:

vanilla, cinnamon, floral, or a neutral additive;

a flattening agent, the zero volatile organic compound colorant, wherein the zero volatile organic compound colorant comprises:

1,2-benzisothiazolin-3-one; and an acrylic polymer, wherein the acrylic polymer comprises:

poly(methacrylate), PMMA, poly(methyl methacrylate); PEMA, poly(ethyl methacrylate); or poly-HEMA, poly(2-hydroxyethyl methacrylate); and a residual monomer, wherein the residual monomer is present in the art paint base material at a concentration of less than 0.01% of the total weight of the art paint base material.

14. The composition of claim 13, wherein the waste architectural paint and waste industrial paint is selected from waste materials that have been sorted by:

color;

base chemical type;

volatile organic compounds; or containers.

15. The composition of claim 14, wherein the base chemical type is at least one of:

oil;

water based;

latex;

organic; or aqueous.

16. The composition of claim 13, wherein:

the art paint base material has a viscosity of between 80 and 170 Krebs units; or the art paint base material has been passed through a 190-sieve filter to remove debris.

17. The composition of claim 13, wherein the art paint base material has a zero volatile organic compound colorant concentration configured to bring the art paint base material within 3% of a selected color pallet.

18. The composition of claim 13, wherein the zero volatile organic compound comprises:

1,2-benzisothiazolin-3-one at a concentration of 0.004 to 0.00004 weight %; or

2-Methyl-3-isothiazolone at concentration of 0.0006 weight %.

19. The composition of claim 13, wherein the flattening agent is an organic thermoset polymethyl urea resins present in a concentration of 0.002 to 2 weight % of the art paint base material.

20. The composition of claim 13, further comprising a heavy body art paint base material, wherein:

the heavy body art paint base material has a viscosity of 80 to 170 Krebs Units; and the heavy body art paint base material has a greater than 31% by weight of the acrylic polymer.

* * * * *